United States Patent
Ikeda et al.

(10) Patent No.: US 10,808,831 B2
(45) Date of Patent: Oct. 20, 2020

(54) VEHICULAR POWER TRANSMITTING SYSTEM

(71) Applicants: TOYOTA JIDOSHA KABUSHIKI KAISHA, Toyota-shi, Aichi (JP); AISIN AW CO., LTD., Anjo-shi, Aichi (JP)

(72) Inventors: Akihiko Ikeda, Miyoshi (JP); Masataka Sugiyama, Toyota (JP); Tomoaki Suzuki, Anjo (JP); Hiroshi Kato, Anjo (JP); Satoshi Miyanaga, Anjo (JP); Kenji Asai, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/354,419

(22) Filed: Mar. 15, 2019

(65) Prior Publication Data
US 2019/0285168 A1  Sep. 19, 2019

(30) Foreign Application Priority Data
Mar. 16, 2018  (JP) .................................. 2018-049848

(51) Int. Cl.
*F16H 57/04* (2010.01)

(52) U.S. Cl.
CPC ..... *F16H 57/0483* (2013.01); *F16H 57/0404* (2013.01); *F16H 57/045* (2013.01); *F16H 57/0436* (2013.01); *F16H 57/0457* (2013.01); *F16H 57/0476* (2013.01); *B60Y 2200/92* (2013.01)

(58) Field of Classification Search
CPC ............... F16H 57/0404; F16H 57/045; F16H 57/0457; F16H 57/0476; F16H 57/0483; F16H 57/0436; B60Y 2200/92
USPC ........................................................ 475/159
See application file for complete search history.

(56) References Cited

U.S. PATENT DOCUMENTS

| | | | |
|---|---|---|---|
| 6,941,922 B2 * | 9/2005 | Williams | F01M 1/02 123/196 R |
| 9,051,856 B2 * | 6/2015 | Takagi | F16H 57/0404 57/404 |
| 9,878,605 B2 * | 1/2018 | Inoue | B60L 3/0023 |

(Continued)

FOREIGN PATENT DOCUMENTS

| | | |
|---|---|---|
| JP | 2017-136964 A | 8/2017 |
| WO | 2015/046592 A1 | 4/2015 |

*Primary Examiner* — Leslie A Nicholson, III
(74) *Attorney, Agent, or Firm* — Oliff PLC

(57) ABSTRACT

In a power transmitting system of a vehicle including a differential gear device including a differential shaft; a first oil pump; a first oil strainer connected to the first oil pump; a second oil pump; a second oil strainer connected to the second oil pump; and a casing within which the engine drive shaft, the differential gear device, the first and second oil pumps, and the first and second oil strainers are accommodated, such that the engine drive shaft and the differential shaft of the differential gear device are spaced apart from each other in a longitudinal direction of the vehicle, the first and the second oil strainers are disposed between the engine drive shaft and the differential shaft of the differential gear device in the longitudinal direction of the vehicle, and are spaced apart from each other in an axial direction of the engine drive shaft.

6 Claims, 3 Drawing Sheets

(56) References Cited

U.S. PATENT DOCUMENTS

| | | | |
|---|---|---|---|
| 10,018,266 B2 * | 7/2018 | Muto | F16H 57/0413 |
| 10,107,382 B2 * | 10/2018 | Tokozakura | F16H 57/0413 |
| 10,190,671 B2 * | 1/2019 | Kito | B60K 6/40 |
| 10,309,524 B2 * | 6/2019 | Kiyokami | F16H 57/0475 |
| 10,371,254 B2 * | 8/2019 | Fukui | F16H 57/04 |
| 2010/0319335 A1 * | 12/2010 | Schneider | F15B 21/00 60/327 |
| 2016/0223070 A1 | 8/2016 | Kito et al. | |
| 2016/0369853 A1 * | 12/2016 | Sugiura | F16H 57/0423 |
| 2017/0219085 A1 * | 8/2017 | Kiyokami | F16H 57/0475 |

* cited by examiner

VEHICULAR POWER TRANSMITTING SYSTEM

This application claims priority from Japanese Patent Application No. 2018-049848 filed on Mar. 16, 2018, the disclosure of which is herein incorporated by reference in its entirety.

FIELD OF THE INVENTION

The present invention relates to an arrangement of a lubricating device provided in a vehicular power transmitting system.

BACKGROUND OF THE INVENTION

There is known a power transmitting system of a vehicle, which includes a first oil strainer connected to a first oil pump, and a second oil strainer connected to a second to a second oil pump. JP2017-136964A discloses an example of this type of power transmitting system, wherein an oil strainer connected to an oil pump operated by a differential gear device, and an oil strainer connected to an oil pump operated by an engine are spaced apart from each other in a longitudinal direction of the vehicle. WO2015/046592 also discloses a vehicular power transmitting system including two oil pumps, and two oil strainers connected to the respective two oil pumps.

By the way, it is difficult to dispose the first and second oil strainers near an axis of an electric motor such that the two oil strainers are spaced apart from each other in the longitudinal direction of the vehicle, where the electric motor and a parking lock mechanism of the vehicular power transmitting system are large-sized according to a demand for increasing the capacity of the vehicular power transmitting system. Further, where the oil strainers are disposed below the parking lock mechanism, there is a restriction of design regarding the positions of installation of the oil strainers. Accordingly, it is required to change the positions of installation of the oil strainers, depending upon various specifications and arrangements of the vehicular power transmitting system. This requirement makes it difficult to suitably design the arrangement of the vehicular power transmitting system.

SUMMARY OF THE INVENTION

The present invention was made in view of the background art described above. It is therefore an object of the present invention to provide a vehicular power transmitting system which is provided with first and second oil strainers and which is configured for easier designing of its arrangement.

The object indicated above is achieved according to the following modes of the present invention:

According to a first mode of the invention, there is provided a power transmitting system of a vehicle, comprising: an engine drive shaft connected to an engine; a differential gear device including a differential shaft; a first oil pump; a first oil strainer connected to the first oil pump; a second oil pump; a second oil strainer connected to the second oil pump; and a casing within which the engine drive shaft, the differential gear device, the first oil pump, the first oil strainer, the second oil pump, and the second oil strainer are accommodated, such that the engine drive shaft and the differential shaft of the differential gear device are spaced apart from each other in a longitudinal direction of the vehicle, such that the engine drive shaft and the differential shaft of the differential gear device are spaced apart from each other in a longitudinal direction of the vehicle, wherein the first oil strainer and the second oil strainer are disposed between the engine drive shaft and the differential shaft of the differential gear device in the longitudinal direction of the vehicle, and are spaced apart from each other in an axial direction of the engine drive shaft.

In a second mode of the invention, the vehicular power transmitting system according to the first mode of the invention is configured such that the first and second oil strainers are disposed at the same position in a vertical direction of the vehicle, and are disposed in a common oil reservoir from which an oil is sucked by the respective first and second oil pumps through the respective first and second oil strainers.

In a third mode of the invention, the vehicular power transmitting system according to the second mode of the invention is configured such that the oil reservoir is formed in a lowermost portion of the casing.

In a fourth mode of the invention, the vehicular power transmitting system according to the first mode of the invention is configured such that the second oil pump is operated by the differential gear device, and is disposed between the engine drive shaft and the differential shaft of the differential gear device.

In a fifth mode of the invention, the vehicular power transmitting system according to the first mode of the invention is configured such that the first oil pump is operated by the engine, and the first oil strainer is disposed closer to the first oil pump than the second oil strainer, in the axial direction of the engine drive shaft.

In a sixth mode of the invention, the vehicular power transmitting system according to any one of the first through fifth modes of the invention is configured such that the first oil pump is connected to an oil passage for supplying an oil to at least one electric motor accommodated within the casing, while the second oil pump is connected to an oil passage for supplying the oil to the at least one electric motor, and gears accommodated within the casing.

In the vehicular power transmitting system according to the first mode of the invention, the engine drive shaft and the differential shaft of the differential gear device are spaced apart from each other in the longitudinal direction of the vehicle such that a space is formed between and below the engine drive shaft and the differential shaft, and the first and second oil strainers are disposed in this space such that the two oil strainers are spaced apart from each other in the axial direction of the engine drive shaft. Accordingly, the present power transmitting system is not required to change the positions of installation of the oil strainers, depending upon various specifications of the power transmitting system. Thus, the power transmitting system can be easily designed so as to have the desired specifications.

In the vehicular power transmitting system according to the second mode of the invention wherein the first and second oil strainers are disposed in the common oil reservoir, the level of the oil in the oil reservoir more stabilized, than where the first and second oil strainers were disposed in respective different oil reservoirs. Accordingly oil inlets of the two oil strainers would not be located above the level of the oil in the oil reservoir, so that a risk of air suction by the first and second oil pumps would be reduced.

In the vehicular power transmitting system according to the third mode of the invention wherein the oil reservoir is formed in a lowermost portion of the casing, the oil easily flows into the oil reservoir, so that a risk of shortage of the amount of oil is reduced.

In the vehicular power transmitting system according to the fourth mode of the invention, not only the first and second oil strainers, but also the second oil pump are disposed in the space formed between the engine drive shaft and the differential shaft of the differential gear device. In this respect, the power transmitting system is not required to change the position of installation of the second oil pump as well as the positions of installation of the first and second oil strainers, depending upon various specifications of the power transmitting system. In addition, a distance between the second oil pump and the second oil strainer can be shortened, so that a required length of a suction conduit connecting the second oil pump to the second oil strainer can be accordingly shortened.

In the vehicular power transmitting system according to the fifth mode of the invention wherein the first oil strainer is disposed closer to the first oil pump than the second oil strainer, a required length of a suction conduit connecting the first oil pump to the first oil strainer can be shortened.

In the vehicular power transmitting system according to the sixth mode of the invention, the oil delivered from the first oil pump is used to cool the at least one electric motor, while the oil delivered from the second oil pump is used to lubricate the gears and to cool the at least one electric motor.

DETAILED DESCRIPTION OF PREFERRED EMBODIMENT

In the present specification, descriptions of positions of various elements of a power transmitting system of a vehicle are based on an assumption that the vehicle lies on a level surface of a ground or roadway parallel to a horizontal plane. It is to be further understood that an "upward direction" and a "downward direction" described in the specification are perpendicular to the horizontal plane, and an "upper portion" and a "lower portion" described in the specification are the upper and lower portions as seen in a vertical plane perpendicular to the horizontal plane.

A preferred embodiment of the present invention will be described in detail by reference to the drawings. It is to be understood that the drawings showing the embodiment are simplified or transformed as needed, and do not necessarily accurately represent dimensions and shapes of various elements of the embodiment.

Figure 1:
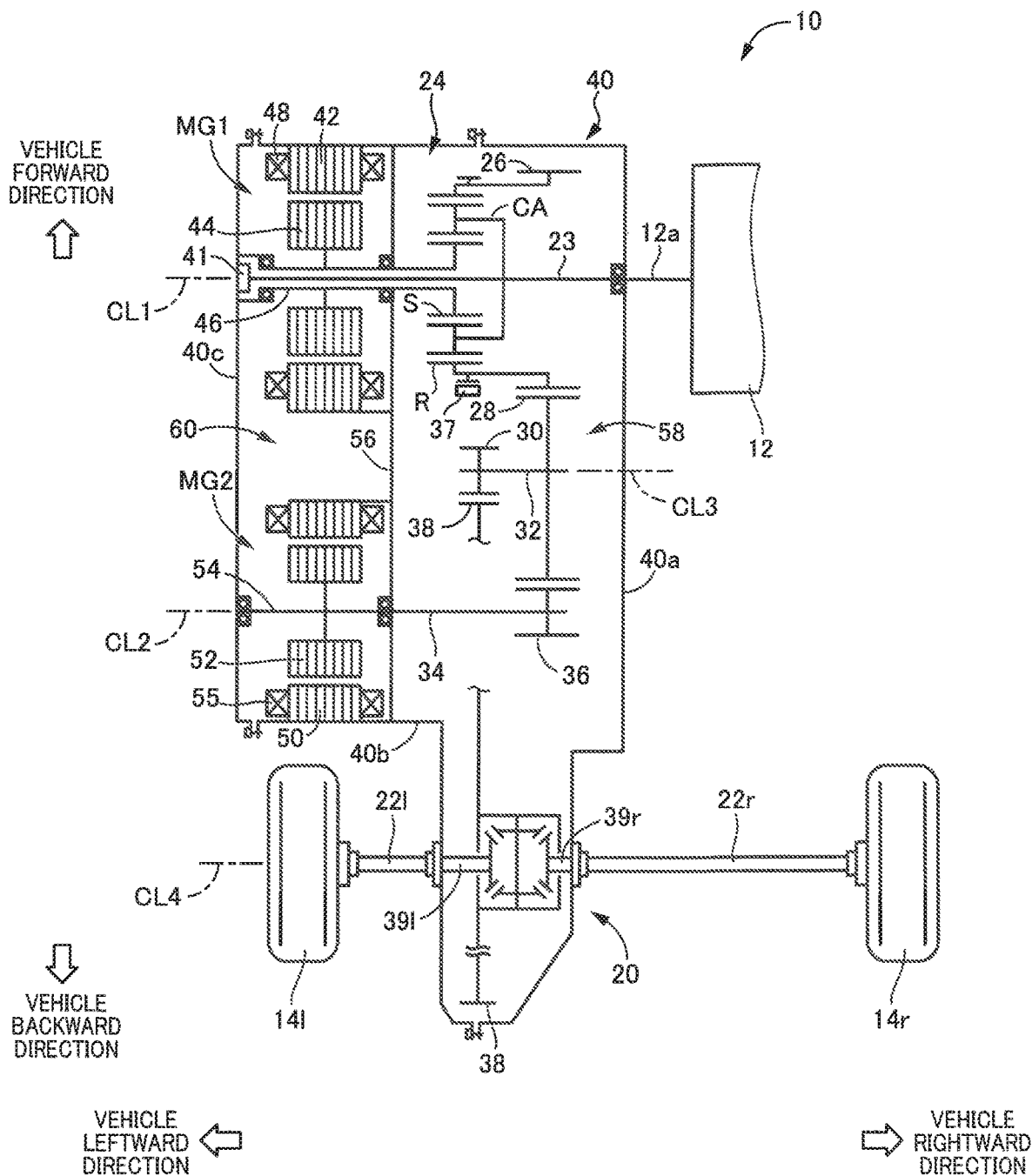
FIG. 1 is a schematic view showing a vehicular power transmitting system according to one embodiment of this invention.

Reference is first made to FIG. 1, which is the schematic view of a power transmitting system 10 of a vehicle, which is constructed according to one embodiment of this invention. This vehicular power transmitting system 10 (hereinafter referred to simply as "power transmitting system 10") is suitably applicable to a vehicle of an FF type (front-engine front-drive type). The power transmitting system 10 is disposed between an engine 12 and a pair of drive wheels 14, and is of a hybrid drive type wherein drive forces of the engine 12 serving as a main drive power source, and a second electric motor MG2 are transmitted to the right and left drive wheels 14$r$ and 14$l$ through a differential gear device 20 and right and left axles 22$r$ and 22$l$. In the schematic view of FIG. 1, upper and lower parts of the view correspond to respective upper and lower portions of the power transmitting system 10, and right-hand and left-hand sides of the view correspond to respective right-hand and left-hand parts of the power transmitting system 10.

As shown in FIG. 1, the power transmitting system 10 includes: an input shaft 23; a planetary gear set 24; an output gear 26; a first electric motor MG1; the above-indicated second electric motor MG2; a power transmitting shaft 34 provided with a speed reducing gear 36; a counter shaft 32 provided with a counter gear 28 and a differential drive gear 30; the above-indicated differential gear device 20; and the above-indicated right and left drive wheels 22$r$ and 22$l$. The power transmitting system 10 further includes a parking lock mechanism 37 for preventing a rotary motion of the output gear 36.

Each of the rotary members included in the power transmitting system 10 is disposed on one of first through fourth axes CL1-CL4 shown in FIG. 1. These four axes CL1-CL4 are parallel to a transverse direction of the vehicle, namely, a direction of width of the vehicle.

On the first axis CL1, there are disposed the input shaft 23, the planetary gear set 24, the output gear 26 and the first electric motor MG1. The input shaft. 23 is operatively connected to a crankshaft 12$a$ of the engine 12 through a damper not shown, in a power transmittable manner. It is noted that the input shaft 23 functions as an engine drive shaft, namely, a drive shaft of the engine provided in the power transmitting system according to the present invention.

The planetary gear set 24 is a single-pinion type planetary gear set having a sun gear S, a carrier CA and a ring gear R. The planetary gear set 24 functions as a power distributing mechanism configured to distribute a drive force of the engine 12 to the output gear 26 and the first electric motor MG1. The sun gear S is operatively connected to the first electric motor MG1 in a power transmittable manner, and the carrier CA is operatively connected to the crankshaft 12$a$ of the engine 12 through the input shaft 23 in a power transmittable manner, while the ring gear R is operatively connected to the output shaft 26 in a power transmittable manner. The ring gear R the output gear 26 are formed integrally with each other, and cooperate to constitute a composite gear.

A first oil pump 41 operated by the engine 12 is disposed on the first axis CL1, at one of opposite axial end portions of the input shaft 23, which is remote from the engine 12. That is, the first oil pump 41 is disposed at one of opposite transverse end positions of the vehicle which is remote from the engine 12. The first oil pump 41 has a drive gear not shown, which is connected to the above-indicated axial end portion of the input shaft 23, so that the first oil pump 41 is operated by the engine 12 through the input shaft 23.

The first electric motor MG1 is disposed on one of opposite sides of a partition wall 56, while the planetary gear set 24 is disposed on the other side of the partition wall 56. Namely, the first electric motor MG1 and the planetary gear set 24 are disposed on the respective opposite sides of the partition wall 56, as seen in the axial direction of the input shaft 23.

On the second axis CL2, there are disposed the second electric motor MG2, the power transmitting shaft 34 and the speed reducing gear 36. The speed reducing gear 36 is fixedly mounted on one of opposite axial end portions of the power transmitting shaft 34, while a rotor shaft 54 (described below) of the second electric motor MG2 is connected to the other axial end portion of the power transmitting shaft 34. Thus, the speed reduction gear 36 is operatively connected to the second electric motor MG2 through the power transmitting shaft 34, in a power transmittable manner.

On the third axis CL3, there is disposed the counter shaft 32 such that the counter shaft 32 is rotatable about the third axis CL3. The counter gear 28 and the differential drive gear 30 are mounted on the counter shaft 32. The counter gear 28 is held in meshing engagement with the output gear 26 and the speed reducing gear 36, while the differential drive gear 30 is held in meshing engagement with a differential ring gear 38 of the differential gear device 20.

On the fourth axis CL4, there are disposed the differential gear device 20 and the pair of axles 33. The differential ring gear 38 of the differential gear device 20 is held in meshing engagement with the differential drive gear 30, so that the drive force of the engine 12 is transmitted to the differential gear device 20 through the differential ring gear 38. The right and left axles 22r and 22l connect the right and left side gears 39r and 39l of the differential gear device 20 to the respective right and left drive wheels 14r and 14l. Since the construction of the differential gear device 20 is well known in the art, the differential gear device 20 will not be further described in detail. It is noted that the right and left side gears 39r and 39l function as a differential shaft of the differential gear device 20 provided in the power transmitting system according to the present invention.

The first electric motor MG1 includes: an annular stator 42 fixed to a stationary member in the form of a casing 40; an annular rotor 44 disposed radially inwardly of the stator 42; and a rotor shaft 46 disposed radially inwardly of the rotor 44 and connected to the rotor 44. The stator 42 is provided with a stator coil 48.

The second electric motor MG2 includes: an annular stator 50 fixed to the casing 40; an annular rotor 52 disposed radially inwardly of the stator 50; and a rotor shaft 54 disposed radially inwardly of the rotor 52 and connected to the rotor 52. The stator 50 is provided with a stator coil 55.

In the power transmitting system 10 constructed as described above, the drive force of the engine 12 is transmitted to the drive wheels 14r and 14l through the planetary gear set 24, the output gear 26, the counter gear 28, the counter shaft 32, the differential drive gear 30, the differential gear device 20, and the axles 22r and 22l. On the other hand, a drive force of the second electric motor MG2 is transmitted to the drive wheels 14r and 14l through the power transmitting shaft 34, the speed reduction gear 36, the counter gear 28, the counter shaft 32, the differential drive gear 30, the differential gear device 20 and the axles 22r and 22l.

The casing 40 consists of a housing 40a, an axle casing 40b and a casing cover 40c. The axle casing 40b is open at its opposite ends as seen in the direction of the input shaft 23. The axle casing 40b is connected to the housing 40a at one of its opposite ends, and to the casing cover 40c at the other end.

The axle casing 40b is provided with a partition wall 56 formed perpendicularly to the first axis CL1. This partition wall 56 divides an interior space of the casing 40 into a gear chamber 58 and a motor chamber 60. The gear chamber 58 accommodates various gears such as gears of the planetary gear set 24, the output gear 26, the counter gear 28, the speed reduction gear 36, and gears of the differential gear device 20, while the motor chamber 60 accommodates the first electric motor MG1 and the second electric motor MG2.

Figure 2:
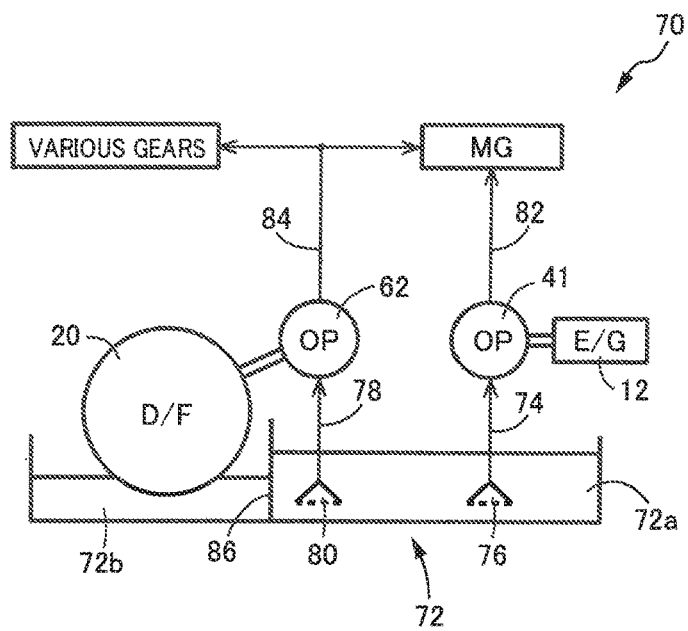
FIG. 2 is a schematic view showing an arrangement of a lubricating device of the power transmitting system of FIG. 1.

Next, a lubricating device 70 provided in the power transmitting system 10 will be described. The lubricating device 70 is configured to supply an oil to the first and second electric motors MG1 and MG2 (hereinafter referred to as "electric motors MG", unless otherwise specified), and to the various gears such as the gears of the planetary gear set 24, which are accommodated within the gear chamber 58. FIG. 2 is the schematic view showing the overall arrangement of the lubricating device 70 of the power transmitting system 10.

The lubricating device 70 includes: the above-indicated first oil pump 41; a second oil pump 62 operated by the differential gear device 20; an oil pan 72 formed in a lower portion of the casing 40; a first oil strainer 76 connected to the first oil pump 41 through a first suction conduit 74; a second oil strainer 80 connected to the second oil pump 62 through a second suction conduit 78; a first oil delivery passage 82 which is connected to a delivery port of the first oil pump 41 and through which the oil is supplied to the electric motors MG accommodated within the motor chamber 60; a second oil delivery passage 84 which is connected to a delivery port of the second oil pump 62 and through which the oil is supplied to the electric motors MG accommodated within the motor chamber 60, and to the various gear deices accommodated within the gear chamber 58. It is noted that the first oil delivery passage 82 functions as an oil passage for supplying the oil to the electric motors, while the second oil delivery passage 84 functions as an oil passage for supplying the oil to the various gears and the electric motors, in the power transmitting system according to the present invention.

The first oil pump 41 which is operated by the engine 12 is operated during running of the vehicle in an engine drive mode, and is held at rest during running of the vehicle in a motor drive mode. On the other hand, the second oil pump 62 has a drive gear held in direct or indirect meshing engagement with the differential ring gear 38 of the differential gear device 20, so that the second oil pump 62 is operated by the differential gear device 20. Accordingly, the second oil pump 62 which is operated by the differential gear device 20 is kept operated during running of the vehicle, irrespective of whether the vehicle is run in the engine drive mode or the motor drive mode.

The oil pan 72 is formed within the gear chamber 58 formed in the lower (bottom) portion of the casing 40. The first oil strainer 76 and the second oil strainer 80 are disposed in the oil pan 72 formed within the gear chamber 58.

The oil pan 72 is provided with a partition wall 86 defining a first oil reservoir portion 72a and a second oil reservoir portion 72b on its opposite sides. The first oil reservoir portion 72 receives the oil which has lubricated the various gears and the electric motors MG and flown down on inner wall surfaces of the casing 40. The oil stored in the first oil reservoir portion 72a is pumped up by the first and second oil pumps 41 and 62 through the first and second oil strainers 76 and 80. It is noted that the first oil reservoir portion 72a functions as an oil reservoir provided in the power transmitting system according to the present invention.

The second oil reservoir portion 72b is disposed below the differential gear device 20, and a part of the differential ring gear 38 is immersed in the oil stored in the second oil reservoir portion 72b, so that the oil in the second oil reservoir portion 72b is splashed up by the rotating differential ring gear 38, and the splashed oil is supplied to the various gears.

The second oil reservoir portion 72b receives primarily the oil which overflows from the first oil reservoir portion 72a over the partition wall 86. While the casing 40 is configured such that a large portion of the oil used for lubrication and cooling of the various components within the casing 40 flows into the first oil reservoir portion 72a, the rest of the oil flows into the second oil reservoir portion 72b. In this respect, it is noted that the partition wall 86 has a hole formed therethrough for communication between the first and second oil reservoir portions 72a and 72b, so that the oil flows from the first oil reservoir portion 72a into the second oil reservoir portion 72b.

Thus, the oil used for lubrication and cooling flows primarily into the first oil reservoir portion 72a, so that the level of the oil in the second oil reservoir portion 72b is lower than that in the first oil reservoir portion 72a, whereby a surface area of a portion of the differential ring gear 38 immersed in the oil is held comparatively small. Accordingly, a resistance of the oil to the rotary motion of the differential ring gear 38 is made small.

In the lubricating device 70, the first oil pump 41 operated by the engine 12 sucks the oil from the first oil reservoir portion 72a through the first oil strainer 76 and the first suction conduit 74, and delivers the oil through the first oil delivery passage 82. The oil delivered from the first oil pump 41 is fed through the first oil delivery passage 82 to a lubricating circuit for supplying the oil to the various gears. Thus, the oil delivered from the first oil pump 41 is supplied to the various gears through the first oil delivery passage 82 and the lubricating circuit. Meanwhile, the second oil pump 62 operated by the differential gear device 20 sucks the oil from the second oil reservoir portion 72b through the second oil strainer 80 and the second suction conduit 78, and delivers the oil through the second oil delivery passage 84. The oil delivered from the second oil pump 62 is fed through the second oil delivery passage 84 to a lubricating circuit for supplying the oil to the various gears, and to a cooling circuit for cooling the electric motors MG. Thus, the oil delivered from the second oil pump 62 is supplied to the various gears and the electric motors MG through the second oil delivery passage 84 and the lubricating and cooling circuits.

Then, the arrangement of the first and second oil strainers 76 and 80 will be described. In the present power transmitting system 10, the first and second oil pumps 41 and 62 are connected to the respective different first and second oil strainers 76 and 80. These two oil strainers 76 and 80 are required to be adequately disposed relative to each other.

It is noted that the power transmitting system 10 is provided with the parking lock mechanism 37 disposed below the output gear 26. The parking lock mechanism 37 is large-sized according to a demand for increasing the torque transmitting capacity of the vehicular power transmitting system 10. Accordingly, there is a restriction of design regarding the positions of installation of the first and second oil strainers 76 and 80 disposed below the parking lock mechanism 37. Therefore, it is required to change the positions of installation of the oil strainers 76 and 80, depending upon various specifications and arrangements of the power transmitting system 10. This requirement makes it difficult to suitably design the arrangement of the power transmitting system 10, and to utilize the power transmitting system 10, for designing a modified configuration of the power transmitting system. Further, there is also a restriction of design regarding the positions of installation of two oil strainers below the electric motors MG, particularly where the electric motors MG are large-sized.

It is also noted that two oil reservoirs would be required for the respective first and second oil strainers 76 and 80, where the two oil strainers 76 and 80 were disposed at different positions in the vertical direction of the vehicle. In this case, the levels of the oil in the two oil reservoirs might not be held stable, so that the oil pumps might suffer from air sucking, resulting in a failure to delivery the oil. Accordingly, it would be required to design the lubricating device so as to avoid the failure of the oil pumps to delivery the oil, and therefore limit an amount of use of the oil delivered from the oil pumps. In view of this problem, the lubricating device 70 according to the present embodiment of the invention is configured to dispose the first and second oil strainers 76 and 80 at the positions described below.

Figure 3:
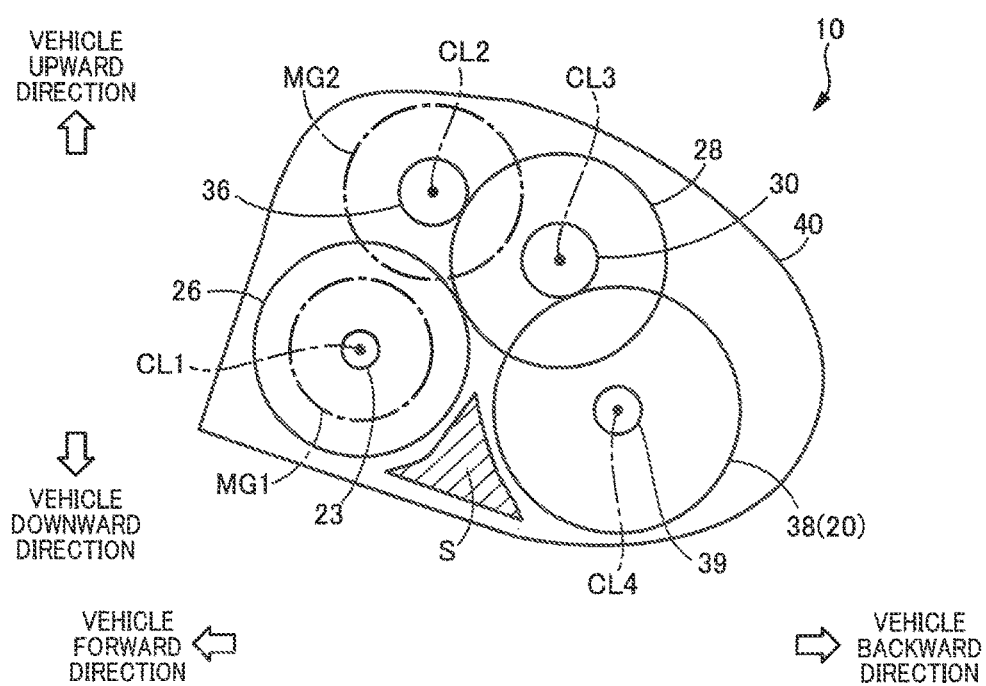
FIG. 3 is a view indicating a positional relationship of various gears and electric motors of the vehicular power transmitting system of FIG. 1, as seen in an axial direction of an input shaft, of the vehicular power transmitting system.

FIG. 3 is the view schematically indicating a positional relationship of the various gears and the electric motors MG of the vehicular power transmitting system 10, as seen in the axial direction of the input shaft 23 when the vehicle lies on a level surface of a ground or roadway. Leftward and rightward directions as seen in the plane of FIG. 3 correspond to respective forward and backward directions of the vehicle, while upward and downward directions as seen in the plane of FIG. 3 correspond to respective upward and downward directions of the vehicle.

As shown in FIG. 3, the input shaft 23, the output gear 26 and the first electric motor MG1 are disposed concentrically with the first axis CL1, and the speed reducing gear 36 and the second electric motor MG2 are disposed concentrically with the second axis CL2. Further, the counter gear 28 and the differential drive gear 30 are disposed concentrically with the third axis CL3, and the differential ring gear 38 and the side gears 39 are disposed concentrically with the fourth axis CL4.

As is apparent from FIG. 3, the input shaft 23 functioning as the drive shaft of the engine 12 is located forwardly of the side gears 39 functioning as the differential shaft of the differential gear device 20. Namely, the input shaft 23 and the side gears 39 are spaced apart from each other by a predetermined spacing distance in the longitudinal direction of the vehicle. In this respect, it is noted that a space S indicated, by hatching lines is left in a lower portion of the casing 40, between the output shaft 26 and the differential ring gear 38 of the differential gear device 20 in the longitudinal direction of the vehicle.

That is, the spacing distance between the input shaft 23 and the side gears 39 in the longitudinal direction of the vehicle is determined so that the space S is provided therebetween. It is also noted that the space S extends over an entire dimension of the gear chamber 58 in the axial direction of the input shaft 23. Thus, the space S has a sufficiently large dimension in the axial direction of the input shaft 23. Within this space S, there are disposed the first and second strainers 76 and 80 such that these two strainers 76 and 80 are spaced apart from each other in the axial direction of the input shaft 23. Since the axial direction of the input shaft 23 is parallel to the transverse or width direction of the vehicle, the first and second strainers 76 and 80 are spaced apart from each other in the transverse direction of the vehicle.

Further, the input shaft 23 is located upwardly of the side gears 39 of the differential gear device 20.

Figure 4:
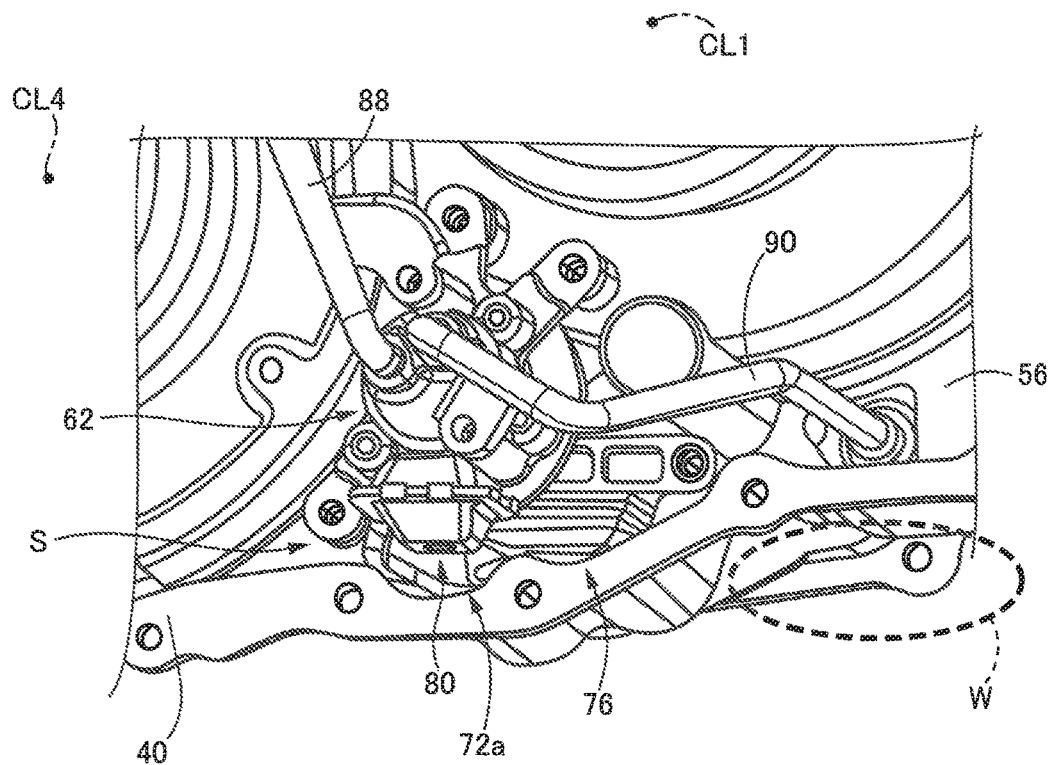
FIG. 4 is a perspective view for explaining positions of installation of first and second oil strainers of the lubricating device, which are disposed in a lower portion of a gear chamber within a casing of the vehicular power transmitting system of FIG. 1.
Figure 5:
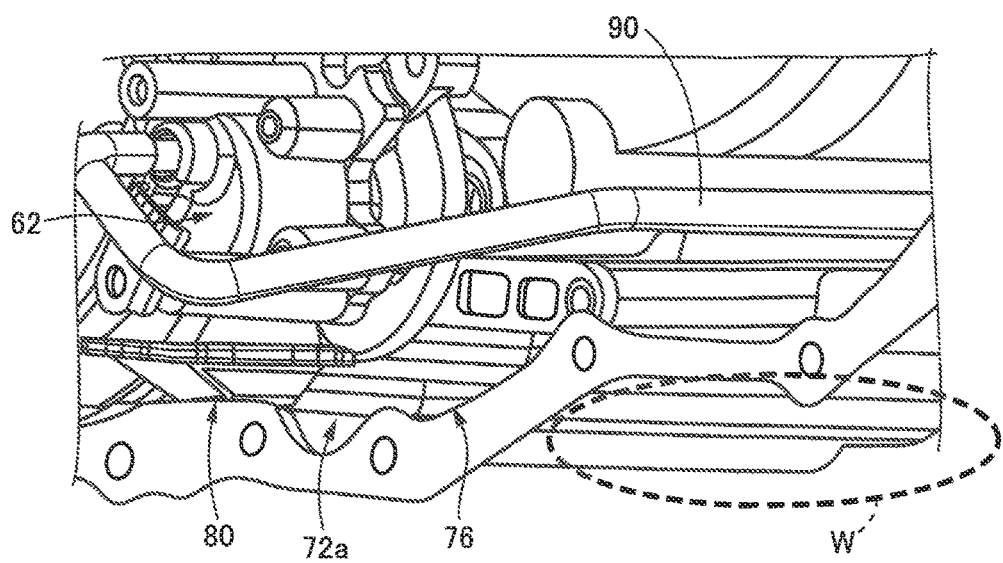
FIG. 5 is a perspective view of the vehicular power transmitting system, as seen in a direction different from that of FIG. 4.

FIG. 4 is the perspective view for explaining the positions of installation of the first and second oil strainers 76 and 80 disposed in the lower portion of the gear chamber 58 within the casing 40 of the power transmitting system 10. The downward and rightward directions as seen in the plane of FIG. 4 correspond to the respective downward and forward directions of the vehicle. The motor chamber 60 accommodating the electric motors MG is formed on one side of the partition wall 56 which is not seen in FIG. 4. For easier understanding of the positional relationship of the first and second strainers 76 and 80 with respect to the first and fourth axes CL1 and CL4, FIG. 4 indicates the positions of the first and fourth axes CL1 and CL4. FIG. 5 is the perspective view of the power transmitting system 10, as seen in a direction different from that of FIG. 4.

As shown in FIGS. 4 and 5, the space is formed in the lower portion of the casing 4, and between the first and fourth axes CL1 and CL4 in the longitudinal direction of the vehicle. The first axis CL1 is the axis of rotation of the input shaft 23, while the fourth axis CL4 is the axis of rotation of the side gears 39 of the differential gear device 20. Within this space S, there is disposed the second oil pump 62 operated by the differential gear device 20, Below the second oil pump 62, there is disposed the second oil strainer 80.

Thus, the second oil strainer 80 is disposed in the space S formed between the input shaft 23 and the side gears 39, and right below the second oil pump 62. Since the second oil strainer 80 is disposed right below the second oil pump 62, a vertical distance between the second oil pump 62 and the second oil strainer 80 can be shortened, so that the required length of the second suction conduit 78 (shown in FIG. 2) connecting the second oil pump 62 and the second oil strainer 80 to each other can be accordingly shortened.

The second oil pump 62 has two delivery ports one of which is connected to a first conduit 88 and the other of which is connected to a second conduit 90, as shown in FIGS. 4 and 5. The first conduit 88 is connected to a lubricating circuit for supplying the oil to the various gears, while the second conduit 90 is connected to a cooling circuit for supplying the oil to the electric motors MG. Accordingly, the oil delivered from the second oil pump 62 is fed through the first conduit 88 to the various gears accommodated within the gear chamber 58, and is fed through the second conduit 88 to the electric motors MG accommodated within the motor chamber 60. In this respect, it is noted that the first conduit 88 and the second conduit 90 correspond to the second oil delivery passage 84. Although FIG. 2 schematically shows the second oil delivery passage 84 which is connected to a single delivery port of the second oil pump 62 and to two branch passages, the second oil pump 62 actually has the two delivery ports to which the respective first and second conduits 88 and 90 are directly connected, as shown in FIG. 4.

The first oil strainer 76 is spaced apart from the second oil strainer 80 in the axial direction of the input shaft 23 (in the direction of the first axis CIA indicated in FIG. 4). The first oil strainer 76 is located closer to the motor chamber 60 than the second oil strainer 80, in the axial direction of the input shaft 23, more specifically, located adjacent to the partition wall. 56 in the axial direction of the input shaft 23. Since the first oil strainer 76 is located closer to the motor chamber 60, the first oil strainer 76 is located closer to the first oil pump 41 than the second oil strainer 80 in the axial direction of the input shaft 23. Thus, the first and second oil strainers 76 and 80 disposed within the space S are spaced apart from each other in the axial direction of the input shaft 23 (in the transverse or width direction of the vehicle), and are disposed at the same position in the vertical direction of the vehicle.

Since the first and second oil strainers 76 and 80 are disposed at the same position in the vertical direction of the vehicle as described above, the first and second oil strainers 76 and 80 are disposed in the common first oil reservoir portion 72a from which the oil is sucked by the first and second oil pumps 41 and 62 through the respective first and second oil strainers 76 and 80, so that the level of the common oil reservoir portion 72a is more stabilized with a smaller amount of air suction by the oil pumps 41 and 62, than where the first and second oil strainers 76 and 80 were disposed in respective different oil reservoir portions.

Further, the first oil reservoir portion 72a is formed in the lowermost (bottom) portion of the casing 40, as shown in FIGS. 4 and 5, and are vertically positioned to permit the first and second oil strainers 76 and 80 to be immersed in the oil stored in the first oil reservoir portion 72a. Described in detail, the first and second oil strainers 76 and 80 are vertically positioned such that their oil inlets are lower than the level of the oil stored in the first oil reservoir portion 72a.

Since the first oil reservoir portion 72a is formed in the lowermost portion of the casing 40 as described above, the oil staying within the casing 40 easily flows into the first oil reservoir portion 72a, ensuring a high degree of stability of an amount of the oil stored in the first oil reservoir portion 72a, and an accordingly increased degree of stability of the level of the oil in the first oil reservoir portion 72a. For instance, the amount of air suction by the first and second oil pumps 41 and 62 can be kept small even during abrupt acceleration or deceleration of the vehicle or during uphill or downhill running of the vehicle. In addition, the high stability of the amount of oil in the first oil reservoir portion 72a permits the use of the oil delivered from the second oil pump 62, for not only lubricating the various gears but also cooling the electric motors MG. Thus, the stable delivery of the oil from the second oil pump 62 ensures an increased range of application of the oil delivered from the second oil pump 62. Accordingly, the required total amount of oil staying within the casing 40 can be reduced.

Further, the first and second oil strainers 76 and 80 which are disposed in the space S are not disposed below the parking lock mechanism 37 in the gear chamber 58. Accordingly, a lower wall of the casing 40 which is located below the parking lock mechanism 37 can be made closer to the parking lock mechanism 37. As a result, the lower wall of the casing 40 can be raised by a distance corresponding to a space W indicated by a broken line in FIGS. 4 and 5. Therefore, the vertical positions of the engine 12 and the planetary gear set 24 can be lowered, so that the center of gravity of the vehicle can be lowered.

The first oil pump 41 not shown in FIGS. 4 and 5 is disposed in the motor chamber 60 on one side of the partition wall 56. In the present embodiment, the first oil pump 41 and the first oil strainer 76 are held communication with each other through a valve body (not shown) disposed in the motor chamber 60. In the present embodiment wherein the first oil strainer 76 is located closer to the motor chamber 60 than the second oil strainer 80, in the axial direction of the input shaft 23, more specifically, located adjacent to the partition wall 56, a distance between the first oil strainer 76 and the valve body can be reduced. Accordingly, the length of the first suction conduit 74 connecting the first oil pump 41 and the valve body can be made shorter than where the first oil strainer 76 is located at the same position as the second oil strainer 80 in the axial direction of the input shaft 23, so that the rigidity of the first suction conduit 74 is increased owing to its short length.

The input shaft 23 and the side gears 39 are spaced apart from each other in the longitudinal direction of the vehicle, so that the space S is formed between the shaft 23 and the side gears 39. Therefore, the first and second oil strainers 76 and 80 can be disposed in the space S such that the strainers 76 and 80 are spaced apart from each other in the axial direction of the input shaft 23. Accordingly, the present power transmitting system 10 wherein the input shaft 23 and the side gears 39 are spaced apart from each other in the longitudinal direction of the vehicle is not required to change the positions of installation of the oil strainers 76 and 80, depending upon various specifications of the power transmitting system 10, Thus, the power transmitting system 10 can be easily designed with the oil strainers 76 and 80 being disposed as described above, irrespective of the torque capacity; the number of the gear shafts and the number of the electric motors, so that the power transmitting system 10 can be modified so as to have a wide variety of specifications.

As described above, the present power transmitting system 10 is configured such that the input shaft 23 and the side gears 39 of the differential gear device 20 are spaced apart from each other in the longitudinal direction of the vehicle so that the space S is formed between the input shaft 23 and the side gears 39, and the first and second oil strainers 76 and 80 are disposed in this space S such that the two oil strainers 76 and 80 are spaced apart from each other in the axial direction of the input shaft 23. Accordingly, the present power transmitting system 10 is not required to change the positions of installation of the oil strainers 76 and 80, depending upon various specifications of the power transmitting system 10. Thus, the power transmitting system 10 can be easily designed so as to have the desired specifications.

While the preferred embodiment of the invention has been described in detail by reference to the drawings, the invention may be otherwise embodied.

In the illustrated embodiment, the first oil pump 41 is operated by the engine 12, while the second oil pump 62 is operated by the differential gear device 20. However, the drive sources for these first and second oil pumps 41 and 62 are not limited to the engine 12 and the differential gear device 20. For example, the first oil pump 41 may be operated by an electric motor.

In the illustrated embodiment, the first electric motor MG1 and the second electric motor MG2 are disposed on the respective different axes in the form of the first and second axes CL1 and CL2. However, the first and second electric motors MG1 and MG2 may be disposed on the same axis in the form of the first axis CL1. Further, the power transmitting system need not be provided with the two electric motors MG in the form of the first and second electric motors MG1 and MG2, but may be provided with only one electric motor MG.

In the illustrated embodiment, the oil delivered from the first oil pump 41 is fed to only the electric motors MG only. However, this oil may be fed to the various gears in the gear chamber 58, as well as to the electric motors MG. Namely, the oils delivered from the first and second oil pumps 41 and 62 may be fed to various other lubricating and cooling points within the casing 40.

While the preferred embodiment and its modifications have been described for illustrative purpose only, it is to be understood that the invention may be embodied with various other changes and improvements, which may occur to those skilled in the art.

NOMENCLATURE OF ELEMENTS

12: vehicular power transmitting system
12: engine
20: differential gear device
23: input shaft (drive shaft of engine)
39*l*, 39*r*: side gears (differential shaft)
40: casing
41: first oil pump
62: second oil pump
72*a*: first oil reservoir portion (oil reservoir)
76: first oil strainer
80: second oil strainer
82: first oil delivery passage
 (oil passage for supplying oil to electric motors)
84: second oil delivery passage
 (oil passage for supplying oil to gears and electric motors)

What is claimed is:

1. A power transmitting system of a vehicle, comprising:
an engine drive shaft connected to an engine;
a differential gear device including a differential shaft;
a first oil pump;
a first oil strainer connected to the first oil pump;
a second oil pump;
a second oil strainer connected to the second oil pump; and
a casing within which the engine drive shaft, the differential gear device, the first oil pump, the first oil strainer, the second oil pump, and the second oil strainer are accommodated, such that the engine drive shaft and the differential shaft of the differential gear device are spaced apart from each other in a longitudinal direction of the vehicle,
wherein the first oil strainer and the second oil strainer are disposed between the engine drive shaft and the differential shaft of the differential gear device in the longitudinal direction of the vehicle, and are spaced apart from each other in an axial direction of the engine drive shaft.

2. The vehicular power transmitting system according to claim 1, wherein the first and second oil strainers are disposed at the same position in a vertical direction of the vehicle, and are disposed in a common oil reservoir from which an oil is sucked by the respective first and second oil pumps through the respective first and second oil strainers.

3. The vehicular power transmitting system according to claim 2, wherein the oil reservoir is formed in a lowermost portion of the casing.

4. The vehicular power transmitting system according to claim 1, wherein the second oil pump is operated by the differential gear device, and is disposed between the engine drive shaft and the differential shaft of the differential gear device.

5. The vehicular power transmitting system according to claim 1, wherein the first oil pump is operated by the engine, and the first oil strainer is disposed closer to the first oil pump than the second oil strainer, in the axial direction of the engine drive shaft.

6. The vehicular power transmitting system according to claim 1, wherein the first oil pump is connected to an oil passage for supplying an oil to at least one electric motor accommodated within the casing, while the second oil pump is connected to an oil passage for supplying the oil to the at least one electric motor, and gears accommodated within the casing.

\* \* \* \* \*